US009651851B2

(12) United States Patent
Tanaka et al.

(10) Patent No.: US 9,651,851 B2
(45) Date of Patent: May 16, 2017

(54) LIGHT SOURCE DEVICE AND PROJECTOR

(71) Applicant: SEIKO EPSON CORPORATION, Tokyo (JP)

(72) Inventors: Katsunori Tanaka, Azumino (JP); Toshihiko Nagumo, Shiojiri (JP); Takuya Hatano, Matsumoto (JP); Keisuke Sakagami, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 14/760,235

(22) PCT Filed: Mar. 18, 2014

(86) PCT No.: PCT/JP2014/001546
§ 371 (c)(1),
(2) Date: Jul. 10, 2015

(87) PCT Pub. No.: WO2014/156056
PCT Pub. Date: Oct. 2, 2014

(65) Prior Publication Data
US 2015/0362829 A1 Dec. 17, 2015

(30) Foreign Application Priority Data

Mar. 26, 2013 (JP) .................................. 2013-063561
Mar. 4, 2014 (JP) .................................. 2014-041608

(51) Int. Cl.
*G03B 21/16* (2006.01)
*G03B 21/14* (2006.01)
(Continued)

(52) U.S. Cl.
CPC ............ *G03B 21/16* (2013.01); *G03B 21/005* (2013.01); *G03B 21/145* (2013.01); *G03B 21/2026* (2013.01); *G03B 21/2093* (2013.01)

(58) Field of Classification Search
CPC . G03B 21/005; G03B 21/145; G03B 21/2026
See application file for complete search history.

(56) References Cited

U.S. PATENT DOCUMENTS 6,891,338 B2   5/2005 Kubo
2001/0005172 A1   6/2001 Miyashita et al.
(Continued)

FOREIGN PATENT DOCUMENTS

JP   2004-006360 A   1/2004
JP   2004-012778 A   1/2004
(Continued)

OTHER PUBLICATIONS

May 27, 2014 Search Report issued in International Application No. PCT/JP2014/001546.

*Primary Examiner* — Sultan Chowdhury
(74) *Attorney, Agent, or Firm* — Oliff PLC

(57) ABSTRACT

An advantage of some aspects of the invention is to provide a light source device and a projector which can acquire a type of a light source. A light source device includes a light source which emits light; and light source housing which accommodates the light source therein. The light source housing includes an attaching unit which can attach a conducting member having conductivity to a surface of the light source housing, and the conducting member is attached to the attaching unit according to the type of the light source. Accordingly, it is possible to acquire the type of the light source based on the presence or absence of the conducting member electrically connected to the terminal of a device to which the light source device is attached, independent of the temperature of the light source device.

10 Claims, 7 Drawing Sheets

(51) Int. Cl.
*G03B 21/20* (2006.01)
*G03B 21/00* (2006.01)

(56) References Cited

U.S. PATENT DOCUMENTS

| | | | |
|---|---|---|---|
| 2005/0073841 A1* | 4/2005 | Imamura | F21V 29/673 362/264 |
| 2006/0007410 A1* | 1/2006 | Masuoka | F21V 7/10 353/99 |
| 2010/0066985 A1* | 3/2010 | Uekura | G03B 21/14 353/99 |
| 2010/0110395 A1 | 5/2010 | Kotani et al. | |
| 2011/0075116 A1* | 3/2011 | Kitahara | H01J 5/54 353/98 |
| 2012/0154761 A1* | 6/2012 | Lin | G03B 21/16 353/58 |
| 2012/0218526 A1* | 8/2012 | Ono | H01J 61/86 353/98 |
| 2012/0242962 A1 | 9/2012 | Miyata | |

FOREIGN PATENT DOCUMENTS

| | | |
|---|---|---|
| JP | 2008-185712 A | 8/2008 |
| JP | 2012-043723 A | 3/2012 |

\* cited by examiner

LIGHT SOURCE DEVICE AND PROJECTOR

TECHNICAL FIELD

The present invention relates to a light source device and a projector.

BACKGROUND ART

In the related art, a projector which modulates light emitted from a light source device provided in the projector, forms an image according to image information, and enlarges and projects the image onto a projection surface such a screen has been known. In such a projector, it is common to configure the light source device to be exchangeable in a case where the life of a light emitting tube configuring the light source device comes to the end, or the like. A projector which lights the light emitting tube in an appropriately control sequence depending on the type of the mounted light emitting tube (discharge lamp) has been known (see PTL 1).

In the projector disclosed in PTL 1, a lamp type detector is provided in a lamp unit, and the lamp type detector detects the lamp type and notifies the detected lamp type to a microcomputer of the projector. The microcomputer outputs a lamp type instruction signal according to the notified lamp type, and a control circuit of a lamp lighting circuit selects a control sequence according to the input lamp type instruction signal from a control sequence corresponding to the plurality of lamp types previously provided, and lights the light emitting tube based on the control sequence. Accordingly, it is possible to light the light emitting tube in an optimal state.

In the projector, a protrusion is provided at an arbitrary position of the lamp unit, a switch to be paired with the protrusion is provided on a main body receiver side, a plurality of positions of the protrusions and the positions of the switches are provided, and accordingly, the type of the lamp is acquired.

CITATION LIST

Patent Literature

PTL 1: JP-A-2004-12778

SUMMARY OF INVENTION

Technical Problem

However, a temperature of the discharge lamp when being lighted excessively increases and a temperature of a housing (accommodation body) which accommodates the discharge lamp therein also excessively increases.

Accordingly, in a case of the configuration of acquiring the lamp type by pressing the switch to be paired with the protrusion provided in the lamp unit against the protrusion, as the projector disclosed in PTL 1, the protrusion may be deformed due to heat of the accommodation body. In such a case, it is difficult to suitably acquire the lamp type (type of the light emitting tube) and to light the light emitting tube in an optimal state.

An advantage of some aspects of the invention is to provide a light source device and a projector which can acquire a type of a light source.

Solution to Problem

According to a first aspect of the invention, there is provided a light source device including: a light source which emits light; and a light source housing which accommodates the light source therein, in which the light source housing includes an attaching unit which can attach a conducting member having conductivity to a surface of the light source housing, and the conducting member is attached to the attaching unit according to the type of the light source.

As the light source, a discharge light emitting type light source lamp such as an extra-high pressure mercury lamp can be used.

According to the first aspect, when an electronic device where the light source device is mounted includes a terminal which can be electrically connected to the conducting member, it is possible to differentiate a case where the terminal is in a conducting state by being connected to the conducting member provided in the light source device, and a case where the terminal is not in a conducting state with no conducting member. Since the conducting member is attached according to the type of the light source, it is possible to acquire the type of the light source configuring the light source device, by determining whether or not the terminal is in the conducting state.

The type of the light source is shown with a presence or absence of the conducting member which comes into contact with the terminal and causes the terminal to be in the conduction state, accordingly, when the conducting member is provided in the light source device and the terminal is connected to the conducting member, it is possible to acquire the type of the light source. Therefore, it is possible to prevent difficulty of acquisition of the type of the light source due to an effect of heat generated in the light source device.

Since the type of the light source can be shown by attaching the conducting member to the attaching unit according to the type of the light source, it is not necessary to separately manufacture the light source housing according to the type of the light source. Therefore, it is possible to simply show the type of the light source.

In the first aspect, it is preferable that the light source housing includes a housing main body which accommodates the light source therein, a duct member which is attached to the housing main body and introduces air introduced into the housing main body, and that the attaching unit is provided on the duct member.

Herein, when lighting the light source, while the temperature of the light source increases, the deterioration proceeds as the high temperature state of the light source continues, and accordingly, it is necessary to cool the light source.

With respect to this, by providing the duct member which introduces air introduced into the housing main body on the housing main body accommodating the light source therein, it is possible to suitably introduce the air into the light source and to cool the light source.

Air flows through the inside of the duct member, and the temperature thereof is lower than the housing main body which is close to the light source. Accordingly, by providing the attaching unit on the duct member, it is possible to suppress deformation of the attaching unit due to heat. Therefore, it is possible to stably attach the conducting member and to reliably bring the conducting member and the terminal to come in contact with each other.

In the first aspect, it is preferable that the duct member includes an introduction port which introduces the air therein, a first duct unit which introduces the air introduced from the introduction port to one side of the housing main body in a vertical direction, and a second duct unit which introduces the air introduced from the introduction port to the other side of the housing main body in a vertical direction, and that the attaching unit is provided on one of the first duct unit and the second duct unit.

Herein, when lighting the light source, since a temperature of the upper portion of the light emitting unit including a light emitting substance enclosed therein in a vertical direction increases, it is necessary to effectively cool the upper portion thereof in the vertical direction, in order to suppress a generation of devitrification.

With respect to this, since the first duct unit and the second duct unit introduce air introduced therein through the introduction port to one side and the other side of the housing main body in the vertical direction, it is possible to easily introduce air flowing to any duct unit to the upper portion of the light source in the vertical direction. Accordingly, it is possible to effectively cool the light source.

By providing the attaching unit on one of the first duct unit and the second duct unit, it is possible to maintain a low temperature of the attaching unit. Accordingly, it is possible to suppress the deformation of the attaching unit due to heat, and therefore, it is possible to stably attach the conducting member and to reliably realize the contact between the conducting member and the terminal.

In the first aspect, it is preferable that the attaching unit is provided at a position of the duct member on the introduction port side.

The position of the duct member on the introduction port side is, for example, a position closer to the introduction port than an outlet, when the light source housing includes the outlet which discharges air introduced into the housing main body by the duct member and has cooled the light source.

According to the first aspect, since air having a comparatively low temperature flows through the portion where the attaching unit is positioned in the duct member, it is possible to reliably maintain a low temperature of the attaching unit. Accordingly, it is possible to suppress the deformation of the attaching unit due to heat, and therefore, it is possible to stably attach the conducting member and to reliably realize the contact between the conducting member and the terminal.

In the first aspect, it is preferable that the conducting member is a plate-shaped metal member.

According to the first aspect, since the conducting member is a metal member, it is possible to suppress the deformation of the conducting member due to heat. Since the conducting member has a plate shape, it is possible to suppress enlargement of the light source device due to installation of the conducting member.

In the first aspect, it is preferable that the light source housing includes a connection unit which supplies supplied power to the light source, and the connection unit is disposed on any of positions on the side opposite to the emission direction of light from the light source housing by the attaching unit, regarding a bottom surface portion of the light source housing, a main surface portion where light is emitted in the light source housing, and a side surface portion intersecting with the bottom surface portion.

As the connection unit, a connector which is provided in the electronic device to which the light source device is connected and is connected with a connection terminal supplying power to the light source device can be exemplified.

Herein, when the light source device is inserted into and mounted on a light source accommodation unit of the electronic device (for example, projector), the following first to third mounting methods are considered.

The first mounting method is a mounting method in which the light source device is inserted along a direction orthogonal to the emission direction of light from the bottom surface portion side of the light source housing.

The second mounting method is a mounting method in which the light source device is inserted along a direction orthogonal to the emission direction of light from the side surface portion side intersecting with the bottom surface portion.

The third mounting method is a mounting method in which the light source device is inserted along the emission direction of light from the main surface portion side.

When the connection unit is provided on the bottom surface portion of the light source housing, it is possible to connect the connection unit to the connection terminal provided in the light source accommodation unit and to realize the mounting of the light source device to the light source accommodation unit and connection between the connection unit and the connection terminal, even when any one of the first to third mounting methods is used.

When the connection unit is provided at a position on the side opposite to the emission direction of light by the attaching unit on the side surface portion intersecting with the main surface portion and the bottom surface portion, it is possible to realize the same effects as those in a case where the connection unit is provided on the bottom surface portion, when the first mounting method is used.

By providing the attaching unit on the light source device using the first to third mounting method, it is possible to reliably acquire the type of the light source device mounted by any mounting method.

According to a second aspect of the invention, there is provided a projector including: the light source device described above; an optical modulation device which modulates light emitted from the light source device; a projection optical device which projects light modulated by the optical modulation device; an exterior housing which accommodates the light source device, the optical modulation device, and the projection optical device therein; a light source accommodation unit which is provided in the exterior housing and detachably accommodates the light source device; and a terminal unit which is disposed at a position corresponding to the attaching unit of the light source device accommodated in the light source accommodation unit of the exterior housing, and electrically comes into contact with and is electrically connected to the conducting member attached to the attaching unit.

According to the second aspect, since the light source device and the terminal unit which electrically comes into contact with and is electrically connected to the conducting member which can be attached to the light source device are included, it is possible to realize the same effects as those of the light source device.

In the second aspect, it is preferable that the terminal unit includes a plurality of spring switches which come in contact with the conducting member and are electrically connected.

According to the second aspect, it is possible to press the spring switch against the attaching unit of the light source accommodated in the light source accommodation unit due to a spring force (biasing force) of each spring switch. Accordingly, it is possible to reliably switch the conduction state and the non-conduction state of the plurality of spring switches depending on the presence or absence of the conducting member, and it is possible to reliably and suitably acquire the type of the light source.

In the second aspect, it is preferable that the plurality of spring switches contain at least three spring switches, and the conducting member comes into contact with at least two spring switches among the three spring switches and causes two spring switches to be electrically connected.

In the second aspect, since two of the three spring switches are electrically connected by the conducting member and the conduction state and the non-conduction state of the spring switches and the type of the light source are associated, it is possible to increase the number of types of the light source to be shown when the conducting member is provided. Therefore, it is possible to show the plurality of types of the light source with a simple configuration.

In the second aspect, it is preferable that the projector further includes: a determination unit which determines the type of the light source based on the conduction state of the terminal unit; and an operation control unit which controls the operation of the projector according to determined results from the determination unit.

According to the second aspect, the determination unit determines the type of the light source based on the conduction state of the terminal unit, and the operation control unit controls the operation of the projector according to the determined results from the determination unit. According to this, it is possible to light the light source by a lighting method corresponding to the type of the light source, and when the cooling device for cooling the light source device is provided, it is possible to control the driving state of the cooling device. Therefore, it is possible to light the light source by a suitable lighting method, to improve lighting starting performance of the light source, and to realize the long life of the light source.

DESCRIPTION OF EMBODIMENTS

[First Embodiment]

Hereinafter, a first embodiment of the invention will be described with reference to the drawings.

[Schematic Configuration of Projector]

Figure 1:
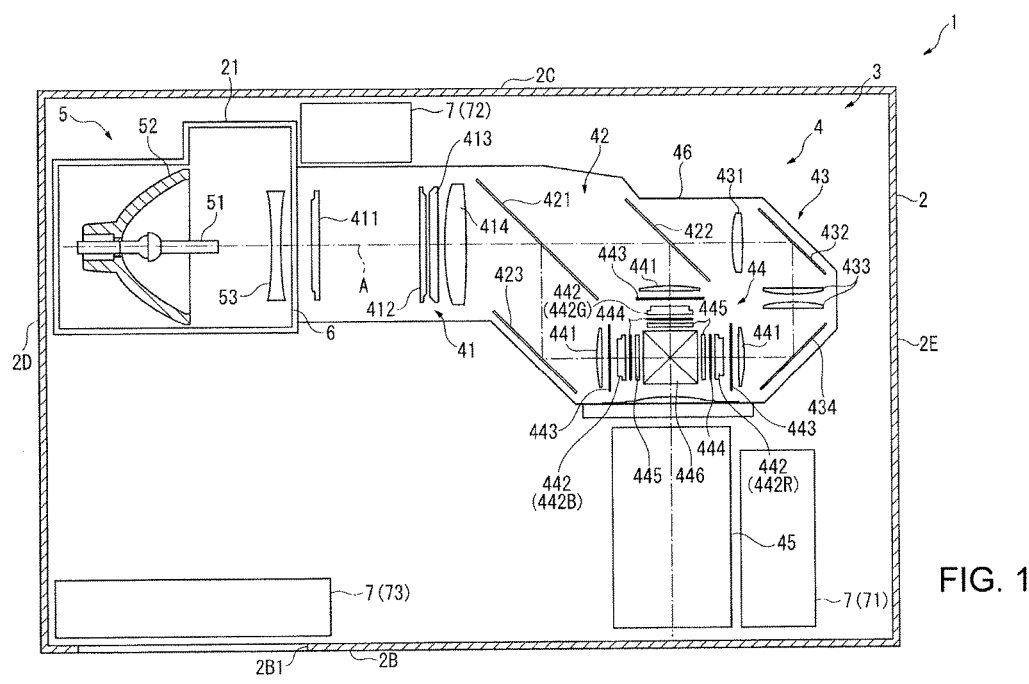
FIG. 1 is a schematic diagram showing a configuration of a projector according to a first embodiment of the invention.

FIG. 1 is a schematic diagram showing a configuration of a projector 1 according to the embodiment.

The projector 1 according to the embodiment is an image display apparatus which modulates light emitted from a light source device 5 provided therein, forms an image according to image information, and projects the image on a projection surface (not shown) such as a screen. As shown in FIG. 1, the projector 1 includes an exterior housing 2 which configures the exterior of the projector 1 and has an approximate rectangular shape in a plan view, and an apparatus main body 3 which is accommodated and disposed in the exterior housing 2.

[Configuration of Exterior Housing]

The exterior housing 2 forms a ceiling (not shown), a main surface 2B, a rear surface 2C, a left surface 2D, a right surface 2E, and a bottom surface (not shown) of the projector 1, and although not shown, a plurality of legs are provided on the bottom surface. When the bottom surface is disposed so as to face downwards in a vertical direction, the projector 1 is set to take a normal posture, and when the bottom surface is disposed so as to face upwards in the vertical direction in a vertically opposite manner to the normal posture, the projector 1 is set to take a upside-down posture.

The exterior housing 2 includes a light source accommodation unit 21 (see FIG. 6) which detachably accommodates the light source device 5 which will be described later, therein. The configuration of the light source accommodation unit 21 will be described later.

[Configuration of Apparatus Main Body]

The apparatus main body 3 includes an optical unit 4 and a cooling device 7. Although not shown in FIG. 1, the apparatus main body 3 includes a power supply unit 8 which supplies power to each configuration member of the projector 1 and a control unit 9 which controls the operation of the projector 1 (see FIG. 7 for both units).

The cooling device 7 includes a plurality of fans 71 to 73 and performs ventilation with air introduced from the outside of the exterior housing 2 to cool the optical unit 4, the power supply unit 8, and the control unit 9. Among the fans 71 to 73, the fan 71 is, for example, a sirocco fan which introduces external air from an inlet port (not shown) formed in the exterior housing 2 and sends the air to an electro-optic device 44 which will be described later.

The fan 72 which is disposed on the light source device 5 side which will be described later and is positioned on the rear surface 2C side is, for example, configured with a sirocco fan, absorbs the air in the exterior housing 2, and sends the air to the light source device 5. In addition, the fan 73 is, for example, configured with an axial fan, absorbs the air which has cooled the light source device 5 and other cooling targets, discharges the air to the main surface 2B side, and further discharges the air to the outside of the exterior housing 2 through an outlet 2B1 formed on the main surface 2B. The fan 72 may be an axial fan and the fan 73 may be a sirocco fan. The outlet 2B1 may be formed on any surface of the exterior housing 2.

[Configuration of Optical Unit]

The optical unit 4 forms and projects an image according to image information under the control of the control unit 9. The optical unit 4 includes the light source device 5, an illumination device 41, a color separation device 42, a relay device 43, the electro-optic device 44, a projection optical device 45, and an optical component housing 46.

Figure 2:
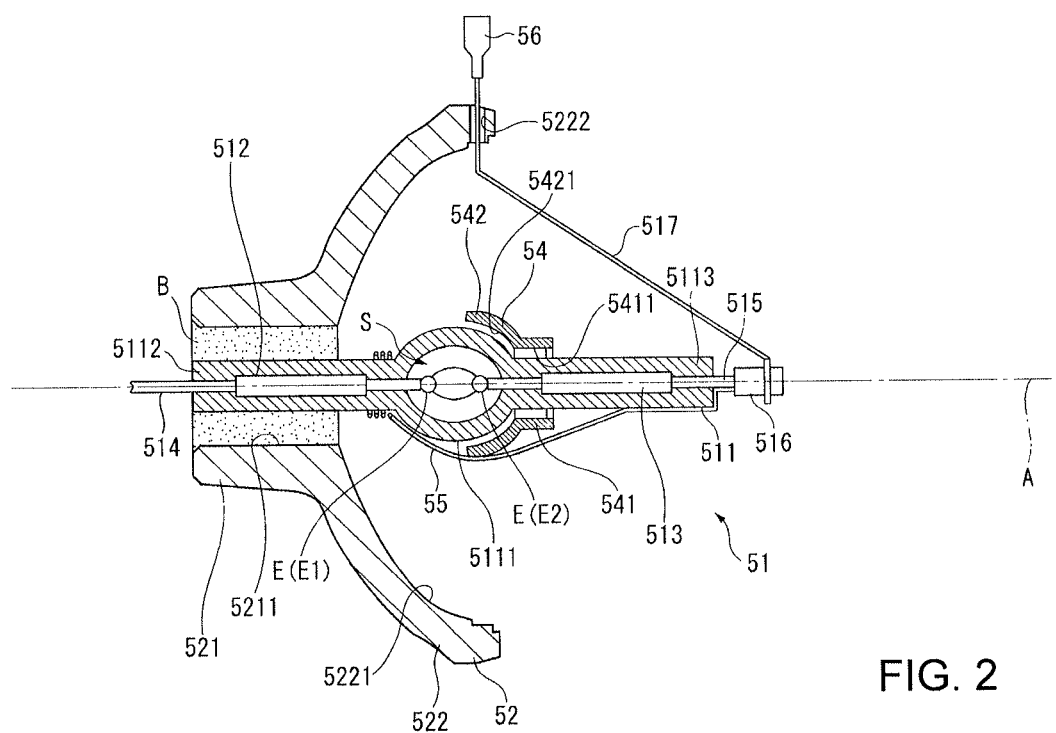
FIG. 2 is a cross-sectional view showing a light source and a main reflector of the first embodiment.

FIG. 2 is a cross-sectional view showing a light source 51 and a main reflector 52.

The light source device 5 includes the light source 51 which is a light source lamp, the main reflector 52 which is attached to the light source 51, a parallelizing lens 53, and a light source housing 6 which accommodates these therein. The configuration of the light source housing 6 will be described later.

As shown in FIG. 2, the light source 51 includes a light emitting tube 511 which includes a light emitting unit 5111 which is swollen in an approximate spherical shape, and a pair of sealing units 5112 and 5113 (the sealing unit on the main reflector 52 side of FIG. 2 is set as 5112 and the sealing unit on the opposite side to the main reflector 52 side is set as 5113) which extend in directions separated from both ends of the light emitting unit 5111.

A pair of electrodes E (E1 and E2) formed with tungsten is disposed in the light emitting unit 5111 and a discharge space S enclosed with a light emitting substance containing mercury, a rare gas, and halogen is formed between the pair of electrodes E1 and E2.

Molybdenum metal foils 512 and 513 electrically connected to electrodes E1 and E2 are inserted into the inside of the pair of sealing units 5112 and 5113, and with a glass material or the like, the end portion of the pair of sealing units 5112 and 5113 on the side opposite to the light emitting unit 5111 is sealed. Electrode extraction lines 514 and 515 extending to the outside of the light emitting tube 511 are connected to the metal foils 512 and 513, and when a voltage is applied to the electrode extraction lines 514 and 515, the light is emitted from the inside of the light emitting unit 5111.

An auxiliary reflector 54 which reflects light emitted to the sealing unit 5113 side from the light emitting unit 5111 to the main reflector 52 side, is fixed to the light emitting tube 511. The auxiliary reflector 54 includes an approximate cylindrical neck portion 541 including an opening unit 5411 through which the sealing unit 5113 penetrates, and a reflecting unit 542 including a concave surface-shaped reflecting surface 5421 which expands from the neck portion 541.

The main reflector 52 reflects the incident light to cause the light to converge to a focal position on the illumination optical axis A, and is fixed to the sealing unit 5112 with an adhesive B. The main reflector 52 includes an approximate cylindrical neck portion 521 including an opening unit 5211 through which the sealing unit 5112 penetrates, and a reflecting unit 522 including a concave surface-shaped reflecting surface 5221 which expands from the neck portion 521. In the embodiment, the reflecting unit 522 is formed as a cold mirror which reflects visible light and transmits infrared light and ultraviolet light.

A trigger line 55 is a start auxiliary line for improving lighting properties of the light emitting tube 511. One end thereof is wound around the sealing unit 5112 in a coil shape, the center thereof is disposed on the outside along the light emitting unit 5111, the auxiliary reflector 54, and the sealing unit 5113, and the other end thereof is connected to the electrode extraction line 515 through a connection unit 516. One end of a lead line 517 extending to the outside of the main reflector 52 is connected to the connection unit 516 through a penetrating hole 5222 formed in the vicinity of the external periphery of the reflecting unit 522, and the other end of the lead line 517 is connected to a terminal 56 for applying a voltage to the electrode extraction line 515 and the trigger line 55.

Returning to FIG. 1, the illumination device 41 uniformly illuminates an image formation region of each liquid crystal panel 442 which will be described later, with light emitted from the light source device 5, and includes two lens arrays 411 and 412, a polarization conversion element 413, and a superposing lens 414.

The color separation device 42 separates the light emitted from the illumination device 41 to each colored light of red, green, and blue and includes dichroic mirrors 421 and 422 and a reflecting mirror 423.

The relay device 43 is provided on an optical path of red light having a longer optical path compared to other colored light, controls optical loss, and includes a light incident side lens 431, a relay lens 433, and reflecting mirrors 432 and 434.

The electro-optic device 44 modulates incident colored light rays of red, green, and blue for each colored light ray, synthesizes each colored light ray, and forms an image. The electro-optic device 44 includes a field lens 441, three liquid crystal panels 442 as optical modulation devices (liquid crystal panels for red light, green light, and blue light are set as 442R, 442G, and 442B), three incident side polarization plates 443, three viewing angle compensation plates 444, three emission side polarization plates 445, and a cross dichroic prism 446 as a color separation device.

The projection optical device 45 is configured as a set lens in which a plurality of lenses are accommodated in a cylindrical lens tube and enlarges and projects an image formed by the electro-optic device 44 onto a projection surface.

The optical component housing 46 is a housing which has an approximate L shape in a plan view and accommodates the light source device 5 and devices 41 to 44 at predetermined positions with respect to the illumination optical axis A which is set therein. A supporting member (not shown) which supports the projection optical device 45 is connected to one end side of the optical component housing 46 (main surface 2B side close to the right surface 2E). An opening portion for accommodating optical components therein is formed on the upper portion of the optical component housing 46 and the opening portion is blocked by a lid.

With the configurations described above, in the optical unit 4, the illuminance in the illumination region is set even by the illumination device 41 and the light emitted from the light source device 5 is separated to colored light rays of red, green, and blue by the color separation device 42. The colored light rays are modulated by the corresponding liquid crystal panels 442, synthesized by the cross dichroic prism 446, and projected by the projection optical device 45.

[Configuration of Light Source Housing]

Figure 3:
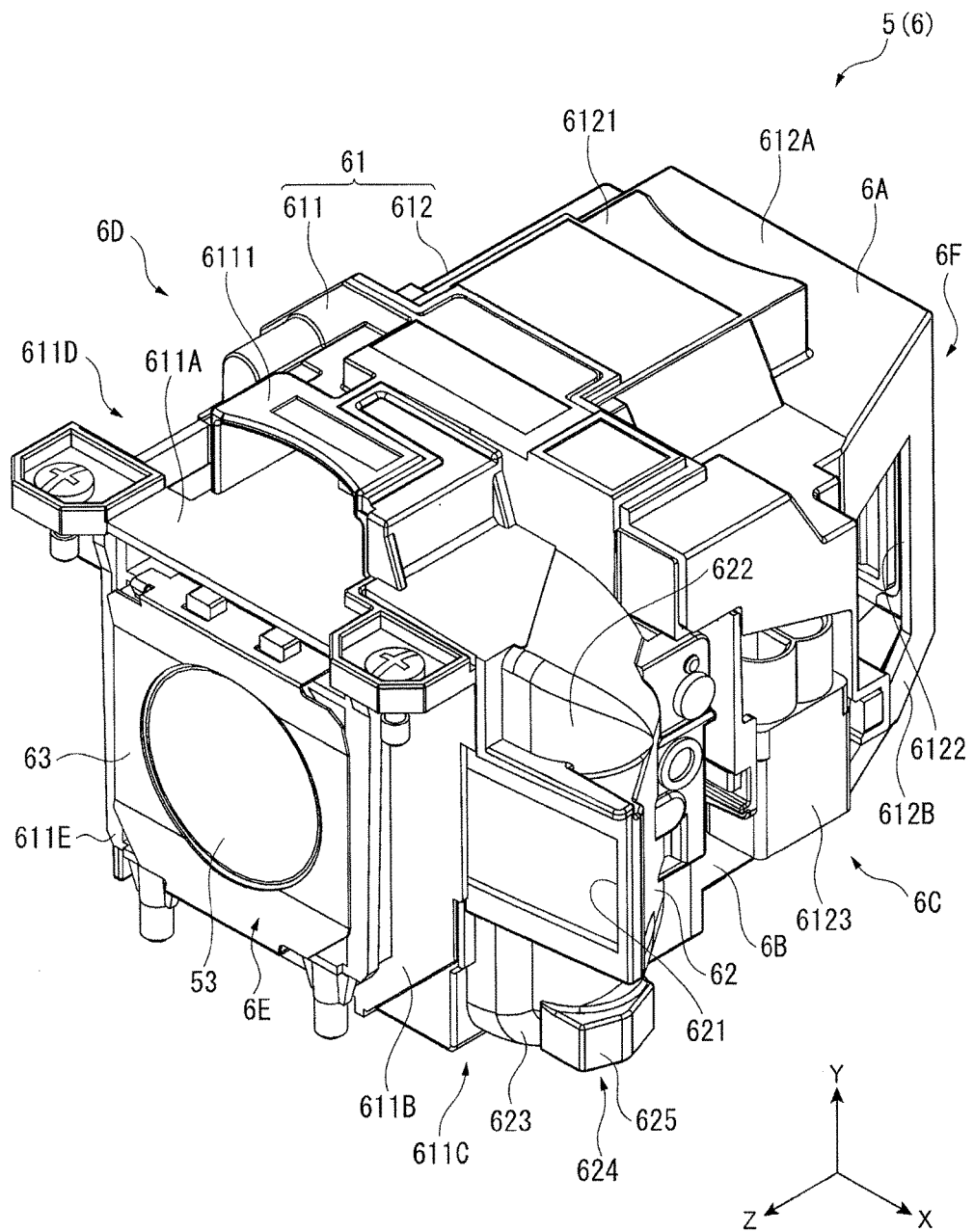
FIG. 3 is a perspective view showing a light source device of the first embodiment.

FIG. 3 is a perspective view showing the light source device 5. In the following description and drawing, a Z direction indicates a proceeding direction of light emitted from the light source device 5 and an X direction and a Y direction indicate directions orthogonal to the Z direction and orthogonal to each other. In addition, when the Z direction is along a horizontal direction and a first surface portion 611A which will be described later is disposed to face upwards (when the light source device 5 is disposed in a normal disposition state which will be described later), a direction to the upper side of the light source device 5 in a vertical direction is set as the Y direction and a direction from the left to the right in a view of the Z direction side is set as the X direction.

As described above, the light source device 5 is configured as a unit including the light source 51, the main reflector 52, and the parallelizing lens 53, and the light source housing 6 which accommodates these therein.

As shown in FIG. 3, the light source housing 6 includes a housing main body 61 which is formed with a synthesis resin containing glass filler and a duct member 62 made of a synthesis resin which is attached to a side surface of the housing main body 61. With such components, a ceiling portion 6A, side surface portions 6B and 6D, a bottom surface portion 6C, a main surface portion 6E, and a rear surface portion 6F of the light source housing 6 are formed.

[Configuration of Housing Main Body]

The housing main body 61 includes a first main body unit 611 and a second main body unit 612. These units are combined with each other and accommodate the light source 51 and the main reflector 52 therein.

The first main body unit 611 is positioned on the proceeding direction side of the light (Z direction side) with respect to the light source 51 and the main reflector 52 and covers the light emitting unit 5111 and the sealing unit 5113 of the light source 51. An opening portion (not shown) through which light emitted from the light source 51 and the main reflector 52 transmits is formed on the first main body unit 611. The parallelizing lens 53 is fit to the opening portion, and a plate spring 63 for fixing the parallelizing lens 53 is attached to an end portion of the first main body unit 611 in the proceeding direction side of the light (Z direction side).

The first main body unit 611 described above includes a first surface portion 611A, a second surface portion 611B, a third surface portion 611C, a fourth surface portion 611D, and a fifth surface portion 611E. The first surface portion 611A and the third surface portion 611C are surfaces on the Y direction side and the side opposite to the Y direction side, and respectively configure the ceiling portion 6A and the bottom surface portion 6C. The second surface portion 611B and the fourth surface portion. 611D are surfaces on the X direction side and the side opposite to the X direction side, and respectively configure the side surface portion 6B and the side surface portion 6D. The fifth surface portion 611E is a surface on the Z direction side and configures the main surface portion 6E for emitting the light.

A first grasping unit 6111 for grasping the light source device 5 is provided on the first surface portion 611A.

The second surface portion 611B is a side surface which intersects with each of the first surface portion 611A and the fifth surface portion 611E to which the plate spring 63 is attached, and is a surface along the fourth surface portion 611D and a vertical surface, when the first surface portion 611A is disposed so as to face upward or downward. Although not shown in the drawing, a slit for introducing air for cooling the end portion of the light source 51 on the sealing unit 5113 side into the first main body unit 611 is formed on the second surface portion 611B. The duct member 62 which will be described later is attached to the second surface portion 611B.

Figure 4:
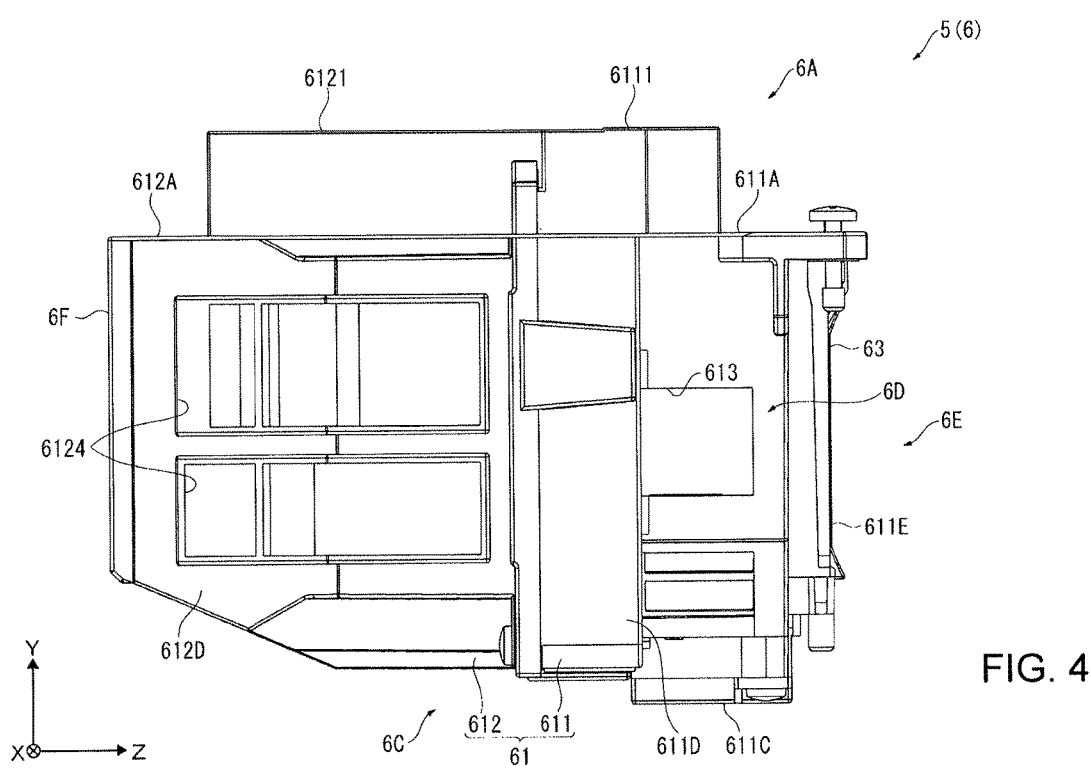
FIG. 4 is a side view showing the light source device of the first embodiment.

FIG. 4 is a side view when the light source device 5 is seen from the fourth surface portion 611D side (that is, aside opposite to the second surface portion 611B).

The fourth surface portion 611D is positioned on a side opposite to the second surface portion 611B to which the duct member 62 is attached. An outlet 613 which discharges air which is introduced into the housing main body 61 by the duct member 62 and has cooled the light emitting tube 511 in the housing main body 61 is formed on the fourth surface portion 611D. A formation position of the outlet 613 is a position of the fourth surface portion 611D according to the disposition position of the duct member 62 of the second surface portion 611B and is a position according to the sealing unit 5113 of the light emitting tube 511 accommodated in the light source housing 6. That is, in the light source housing 6, the duct member 62 is attached to the position on the side opposite to the outlet 613.

As shown in FIGS. 3 and 4, the second main body unit 612 is positioned on the side opposite to the proceeding direction side of the light (opposite to the Z direction side) with respect to the light source 51 and the main reflector 52 and covers the surface opposite to the reflecting surface 5221 of the main reflector 52.

A first surface portion 612A (surface on Y direction side) of the second main body unit 612 configures the ceiling portion 6A with the first surface portion 611A. A second grasping unit 6121 to be grasped by a user together with the first grasping unit 6111 is provided on the first surface portion 612A.

As shown in FIG. 3, a second surface portion 612B (surface on X direction side) of the second main body unit 612 configures the side surface portion 6B with the second surface portion 611B. An opening portion 6122 for introducing the air cools the main reflector 52 into the second main body unit 612 is formed on the second surface portion 612B. A connector 6123 as a connection unit connected to the terminal 56 and the electrode extraction line 514 is provided on the second surface portion 612B. The connector 6123 is positioned on the side opposite to the Z direction (emission direction of light from light source device 5) by an attaching unit 624.

As shown in FIG. 4, a fourth surface portion 612D (surface opposite to X direction side) of the second main body unit 612 configures the side surface portion 6D with the fourth surface portion 611D. An opening portion 6124 for discharging the air introduced into the second main body unit 612 from the opening portion 6122 and cooled the rear surface side of the main reflector 52 to the outside of the second main body unit 612 is formed on the fourth surface portion 612D.

[Configuration of Duct Member]

As shown in FIG. 3, the duct member 62 is formed to have an approximate lateral U shape when seen from the proceeding direction side of light (Z direction side), and is attached across the second surface portion 611B along the vertical surface in a state of the light source device 5 disposed so that the first surface portions 611A and 612A face upward (state shown in FIG. 3 and hereinafter referred to as normal disposition state) and some parts of the first surface portion 611A and the third surface portion 611C on the second surface portion 611B side, as described above. The duct member 62 includes an introduction port 621, a first duct unit 622, and a second duct unit 623.

The introduction port 621 is formed in a rectangular shape in approximate the center of the duct member 62 in the vertical direction in the normal disposition state. The introduction port 621 introduces the air discharged from the fan 72 into the duct member 62.

The first duct unit 622 and the second duct unit 623 introduce the air introduced from the introduction port 621 to the first surface portion 611A of the first main body unit 611 and the third surface portion 611C (surface on the side opposite to the Y direction) side on the side opposite to the first surface portion 611A.

Specifically, the first duct unit 622 extends to the upper side in the vertical direction (Y direction side) from the introduction port 621 in the normal disposition state and is curved in a direction approaching the second surface portion 611B (side opposite to the X direction). One end portion of the first duct unit 622 is connected to the second surface portion 611B so as to communicate with an upper side opening portion (not shown) which is formed on the second surface portion 611B. The air flowing through the first duct unit 622 is introduced into the first main body unit 611 through the upper side opening portion and is mainly sent to the light emitting unit 5111.

The second duct unit 623 extends to the lower side in the vertical direction (side opposite to the Y direction) from the introduction port 621 in the normal disposition state and is curved in a direction approaching the second surface portion 611B (side opposite to the X direction). One end portion of the second duct unit 623 is connected to the second surface portion 611B so as to communicate with a lower side opening portion (not shown) which is formed on the second surface portion 611B. The air flowing through the second duct unit 623 is introduced into the first main body unit 611 through the lower side opening portion and is mainly sent to the light emitting unit 5111.

Herein, although not shown in the drawing, the duct member 62 includes a flow diverting member at a position according to the introduction port 621. One end of the flow diverting member which is plate-shaped is rotatably supported by the first main body unit 611 and the duct member 62 and the other end thereof is configured to be rotatable around a rotation shaft of the one end by its own weight. A hole penetrating the flow diverting member is formed on the flow diverting member.

Since the other end of the flow diverting member rotates by its own weight, a flow direction of some air of the air introduced into the duct member 62 is changed to the upper portion in the vertical direction and is introduced to a duct unit positioned on the upper portion in the vertical direction according to a posture of the projector 1, among the first duct unit 622 and the second duct unit 623. That is, the flow diverting member functions as a member which switches the flow path of the air. Meanwhile, some air of the air introduced into the duct member 62 passes through the hole formed on the flow diverting member and is introduced to the duct portion positioned on the lower portion in the vertical direction.

In the embodiment, the size and the number of holes of the plate-shaped members are set so that a flow rate of the air into the duct unit positioned on the upper portion in the vertical direction is greater than a flow rate of the air into the duct unit positioned on the lower portion in the vertical direction.

[Flow Path of Air Introduced into Duct Member]

The air introduced to the duct member 62 by the introduction port 621 flows through flow paths divided into the following first to third flow paths.

The first flow path is a flow path for some air introduced by the introduction port 621 to flows into the first main body unit 611 through the slit formed on the second surface portion 611B, and which faces a region of the light source 51 on the sealing unit 5113 side and cools the region.

The second flow path is a flow path for some air introduced by the introduction port 621 to be introduced by the flow diverting member, to pass through the duct unit positioned on the upper portion in the vertical direction, and to flow into the first main body unit 611 through the opening connected with the duct unit, and which faces the light emitting unit 5111 of the light source 51 and cools the light emitting unit 5111 from the upper portion.

The third flow path is a flow path for some air introduced by the introduction port 621 to pass through the hole of the flow diverting member, to pass through the duct unit positioned on the lower portion in the vertical direction, and to flow into the first main body unit 611 through the opening connected with the duct unit, and which faces the light emitting unit 5111 of the light source 51 and cools the light emitting unit 5111 from the lower portion.

Herein, since the flow rate of the air passing through the second flow path is greater than the flow rate of the air passing through the third flow path by the flow diverting member, it is possible to effectively cool the upper portion of the light emitting unit 5111 in the vertical direction having a higher temperature than that of the lower portion thereof in the vertical direction. In addition, since the lower portion thereof in the vertical direction is also cooled, it is possible to effectively cool the entire light emitting unit 5111.

With such configurations, it is possible to effectively cool the light source 51, when the projector 1 takes any posture of the normal posture and the upside-down posture.

[Configuration of Attaching Unit]

Figure 5:
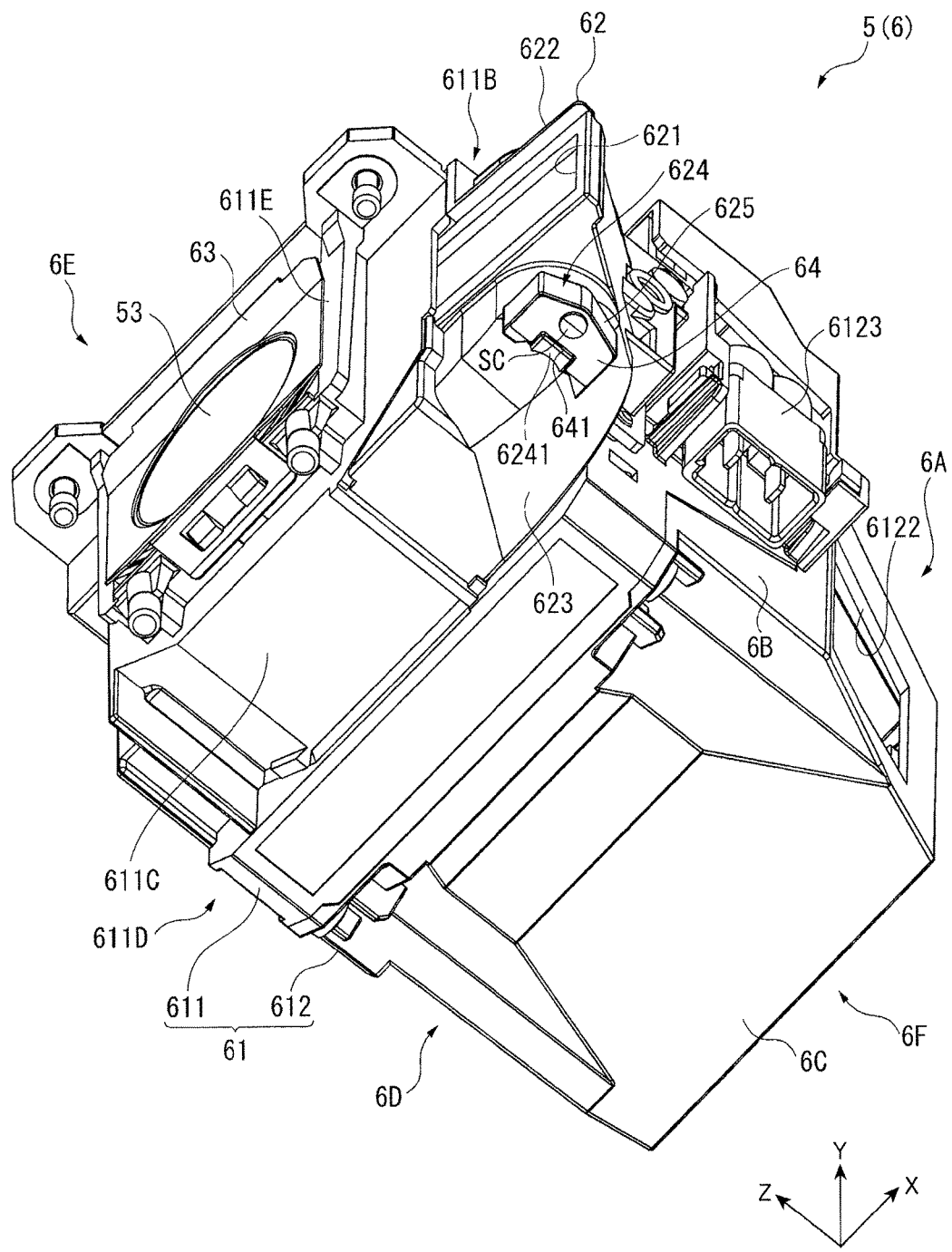
FIG. 5 is a perspective view showing the light source device of the first embodiment.

FIG. 5 is a perspective view when the light source device 5 in the normal disposition state is seen from the lower side (side opposite to the Y direction).

As shown in FIG. 5, the attaching unit 624 which can attach an approximate U-shaped conducting member 64 by a screw SC is provided on the duct member 62. Specifically, on an end portion of the second duct unit 623 on the side opposite to the first duct unit 622 side (end portion on the side opposite to the Y direction), a protrusion 625 which protrudes to the outside (X direction side) from the end portion is provided. The attaching unit 624 is provided on the surface of the protrusion 625 on the side opposite to the first duct unit 622 side (surface on the side opposite to the Y direction), and is smoothly formed.

An installation position of the attaching unit 624 is a position having a comparatively lower temperature in the duct member 62. Specifically, the attaching unit 624 is installed in a position on the introduction port 621 in the duct member (position close to the introduction port 621). That is, in the light source housing 6, the attaching unit 624 is installed in a position on the side opposite to the side surface portion 6D (fourth surface portion 611D) where the outlet 613 (see FIG. 4) is formed and a position closer to the introduction port 621 compared to the outlet 613. Since the air which has been introduced into the duct member 62 from the outside of the light source housing 6 and has a comparatively lower temperature, and which passes through the inside of the duct member 62, it is possible to maintain a low temperature of the portion corresponding to the attaching unit 624 of the duct member 62 and to maintain a low temperature of the attaching unit 624.

[Configuration of Conducting Member]

The conducting member 64 is a plate-shaped metal member which is a terminal with which a spring switch 2132 (see FIG. 6) which will be described later comes into contact. The conducting member 64 is attached to the attaching unit 624 according to the type of the light source 51. Specifically, when one light source among two types of the light sources having different driving systems, is used for the light source device 5, the conducting member 64 is attached to the attaching unit 624, and when the other light source is used, the conducting member 64 is not attached to the attaching unit 624.

As shown in FIG. 5, a rotation regulating unit 6241 which protrudes to the side opposite to the Y direction is provided on the attaching unit 624. The rotation regulating unit 6241 is fit to a recess 641 provided on the conducting member 64 and regulates the rotation when the conducting member 64 is fixed by a screw.

[Configuration of Light Source Accommodation Unit]

Figure 6:
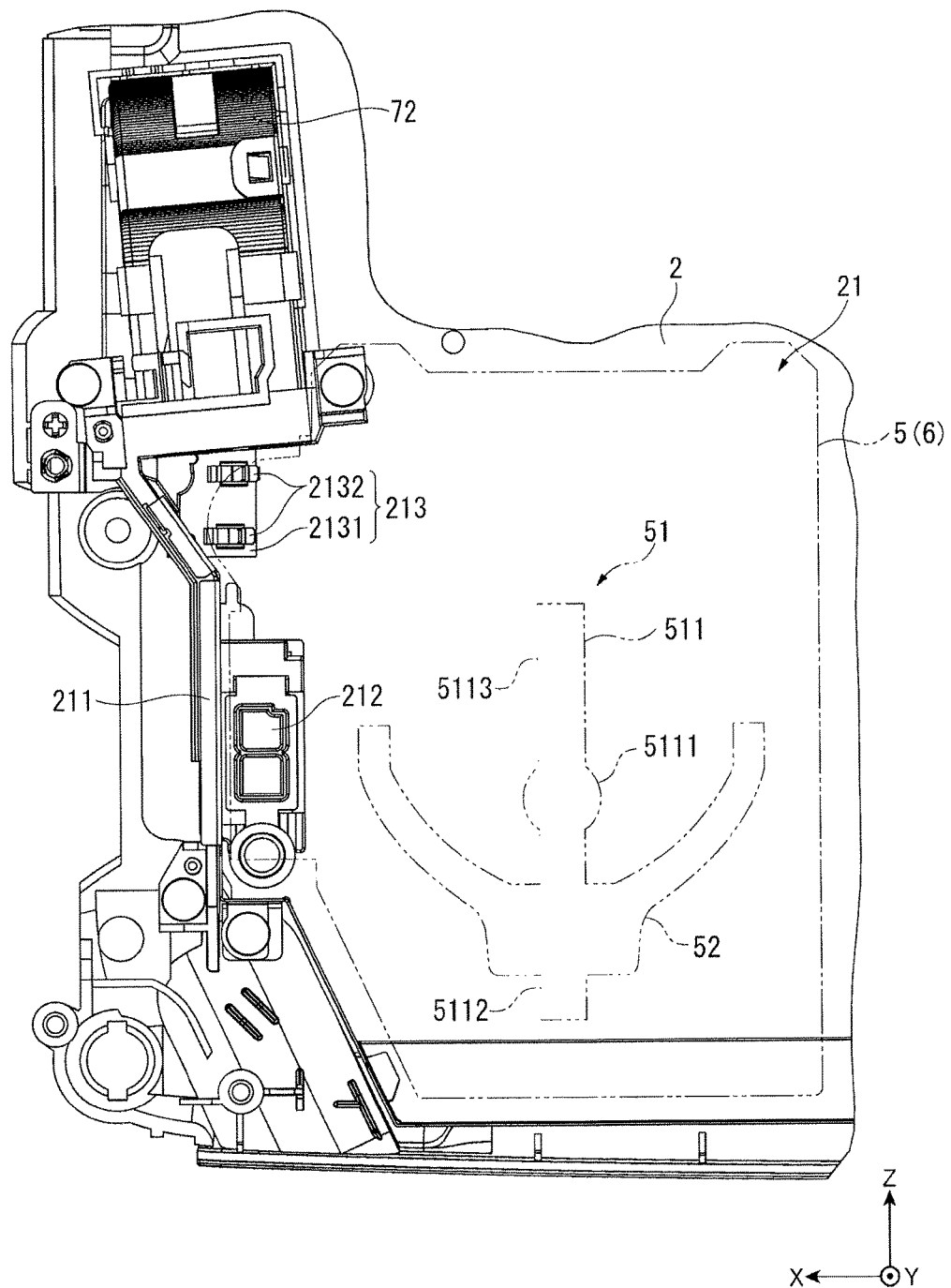
FIG. 6 is a plan view showing a light source accommodation unit of the first embodiment.

FIG. 6 is a plan view showing the light source accommodation unit 21. Dashed-two dotted lines of FIG. 6 show an outer shape of the light source device 5 when accommodated in the light source accommodation unit 21 and an outer shape of the light source 51 and the main reflector 52 configuring the light source device 5.

As described above, the light source accommodation unit 21 is a portion where the light source device 5 is accommodated in the exterior housing 2. As shown in FIG. 6, the light source accommodation unit 21 includes a side wall 211, a connector 212, and a terminal unit 213.

The side wall 211 stands on the inner surface of the exterior housing 2. The side wall 211 functions as a guide for guiding the light source device 5 to the light source accommodation unit 21, and also has a function of regulating oscillation of the accommodated light source device 5. Although not shown in the drawing, openings through which air passes for cooling the light source device 5 are formed at a plurality of portions on the side wall 211. For example, the opening through which air introduced into the duct member 62 through the introduction port 621 is formed on a position corresponding to a discharge port of the fan 72.

In the light source accommodation unit 21, the connector 212 is provided at a position corresponding to the connector 6123 installed in the light source housing 6 of the accommodated light source device 5 and is connected to the connector 6123. The connector 212 is connected to the power supply unit 8 (see FIG. 7) and supplies lamp power supplied from the power supply unit 8 to the connector 6123.

The terminal unit 213 comes into contact with the attaching unit 624 of the light source device 5 or the conducting member 64 attached to the attaching unit 624 and detects the type of the light source device 5, that is, the type of the light source 51. The terminal unit 213 includes a substrate 2131 which is provided in the vicinity of the disposition position of the fan 72 in the light source accommodation unit 21 and two spring switches 2132 which are provided on the substrate 2131.

The substrate 2131 outputs a signal of a voltage level according to the conduction state of the two spring switches 2132 to the control unit 9.

The two spring switches 2132 are provided at positions coming in contact with tip portions of the approximate U shape of the conducting member 64 and are configured so as to cause a biasing force to act in a direction opposite to a side where the spring switches 2132 are provided on the substrate 2131 (that is, Y direction with respect to the attaching unit 624). When the light source device 5 in which the conducting member 64 is attached to the attaching unit 624 is accommodated in the light source accommodation unit 21 and the spring switches 2132 are electrically connected to the conducting member 64 to become the conduction state, the voltage level output to the control unit 9 from the substrate 2131 changes. Meanwhile, when the light source device 5 without the attachment of the conducting member 64 is accommodated, the spring switches 2132 are not in the conduction state and the voltage level output to the control unit 9 from the substrate 2131 does not change.

As described above, since the voltage level of the signal output from the substrate 2131 to the control unit 9 changes depending on whether or not the conducting member 64 is attached to the attaching unit 624 of the light source device 5, the control unit 9 can determine the type of the light source 51 by obtaining the voltage level.

As shown in FIG. 6, the spring switches 2132 come in contact with the conducting member 64 at a position separated from the light emitting unit 5111 having a high temperature in the light source device 5. That is, the attaching unit 624 which can attach the conducting member 64 is provided at a position separated from the light emitting unit 5111 in the light source device 5. The attaching unit 624 is provided at a position also separated from the main reflector 52 having a comparatively high temperature in the light source device 5. In addition, as described above, the attaching unit 624 is provided at a position on the side opposite to the side surface portion 6D (fourth surface portion 611D) where the outlet 613 discharging the air which cooled the light emitting tube 511 is formed.

As described above, the attaching unit 624 is provided at a position having a small effect of heat from the light emitting unit 5111 and the main reflector 52 in the light source device 5, that is, a position having a comparatively low temperature in the light source device 5, and the spring switches 2132 are provided according to the position of the attaching unit 624.

Although not shown in FIG. 6, a lid detection unit 214 and a light source detection unit 215 (see FIG. 7 for both units) are further provided in the light source accommodation unit 21. Among these, the lid detection unit 214 detects a lid member for blocking the opening of the exterior housing 2 which accommodates the light source device 5 in the light source accommodation unit 21. The light source detection unit 215 detects the presence and absence of the light source device 5 in the light source accommodation unit 21.

[Configuration of Power Supply Unit]

Figure 7:
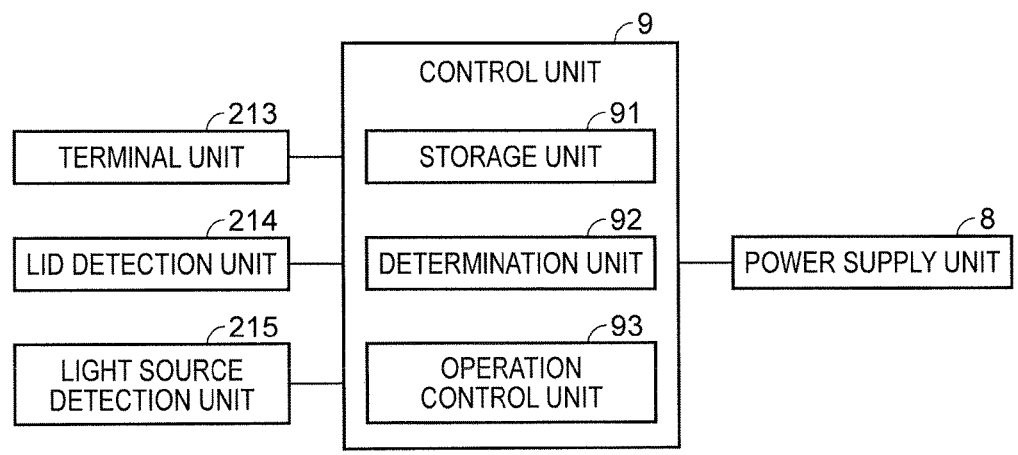
FIG. 7 is a block diagram showing a configuration of a power supply unit and a control unit of the first embodiment.

FIG. 7 is a block diagram showing a configuration of the power supply unit 8 and the control unit 9.

The power supply unit 8 supplies the power to each configuration component of the projector 1. Although not shown, the power supply unit 8 includes a primary side power supply system which rectifies a commercial alternating current supplied from the outside through a power cable, and performs smoothing and boosting, and a secondary side power supply system which transforms the power supplied from the primary side power supply system according to each configuration component of the projector 1 and supplies the power to each configuration component.

[Configuration of Control Unit]

The control unit 9 controls the operation of the projector 1 and includes a circuit board or the like where a central processing unit (CPU) or a memory is mounted. The control unit 9, for example, causes the power supply unit 8 to drive the light source 51 in a driving system according to the type of the light source 51. As shown in FIG. 7, the control unit 9 includes a storage unit 91 configured with a memory, and a determination unit 92 and a operation control unit 93 which are realized by processing programs stored in the memory by the CPU.

The storage unit 91 stores programs or data necessary for the operation of the projector 1. The storage unit 91, for example, stores lighting information obtained by correlating the type of the light source 51 and the driving system (for example, driving waveform) of the light source 51 according to the type.

The determination unit 92 realizes various determination processes. The determination unit 92, for example, determines whether or not the lid member is mounted on the exterior housing 2 based on detected results from the lid detection unit 214, that is, whether or not the lid member blocks the opening accommodating the light source device 5 of the exterior housing 2. The determination unit 92 determines whether or not the light source device 5 is accommodated in the light source accommodation unit 21 based on the detected results from the light source detection unit 215. When it is determined that the opening of the exterior housing 2 is blocked by the lid member and the light source device 5 is accommodated in the light source accommodation unit 21, the determination unit 92 determines the type of the light source 51 based on a signal input from the terminal unit 213. In the embodiment, since the voltage level of the signal and the type of the light source 51 are correlated, the determination unit 92 determines the type of the light source 51 based on the voltage level.

The operation control unit 93 controls the operation of the projector 1 according to the type of the light source 51 determined by the determination unit 92. The operation control unit 93 acquires the driving system according to the type of the light source 51 by referring to the storage unit 91 and lights the light source 51 based on the driving system.

According to the projector 1 according to the embodiment described above, the following effects are obtained.

The light source housing 6 includes the attaching unit 624 which can attach the conducting member 64 according to the type of the light source 51. According to this, the control unit 9 can determine and acquire the type of the light source 51, based on the conduction state of the two spring switches 2132 provided at a position electrically coming into contact with the conducting member 64. Accordingly, it is possible to identify the type of the light source 51 based on the presence or absence of the conducting member 64.

Even when the attaching unit 624 is deformed due to heat generated from the light source 51, it is possible to acquire the type of the light source 51 based on the conduction state of the spring switches 2132, as long as the conducting member 64 and the spring switches 2132 can be electrically connected to each other, and accordingly, it is possible to prevent difficulty of acquisition of the type of the light source 51 due to the effect of heat generated in the light source device 5.

Since it is possible to identify the type of the light source 51 depending on the presence or absence of the conducting member 64, it is not necessary to separately manufacture the light source housing 6 according to the type of the light source 51. That is, it is possible to use common light source housing 6. Therefore, it is possible to simply identify the type of the light source 51.

Since the light source housing 6 includes a housing main body 61 which accommodates the light source 51 therein and the duct member 62 which introduces the air introduced into the housing main body 61, it is possible to introduce the air to the light source 51 and to cool the light source 51.

Since the attaching unit 624 is provided on the duct member 62, it is possible to dispose the attaching unit 624 at a position separated from the light source 51 having a high temperature, and to suppress the deformation of the attaching unit 624 due to the effect of heat generated from the light source 51. Accordingly, it is possible to stably attach the conducting member 64 to the attaching unit 624 and to ensure the connection between the conducting member 64 and the spring switch 2132.

In addition, since the air flows through the inside of the duct member 62, the temperature decreases by the housing main body 61 positioned at a position close to the light source 51. Since the attaching unit 624 is provided on the duct member 62 described above, it is possible to suppress the deformation of the attaching unit 624 due to heat. Accordingly, it is possible to stably attach the conducting member 64 to the attaching unit 624 and to reliably bring the conducting member 64 and the spring switch 2132 to come in contact with each other.

Since one of the first duct unit 622 and the second duct unit 623 introduces the air which is introduced into the duct member 62 through the introduction port 621 to the upper portion of the housing main body 61 in the vertical direction, according to the posture of the installed projector 1, that is, the posture of the light source device 5, and the air flows into the housing main body 61 through the opening, it is possible to cool from the upper portion of the light emitting unit 5111 in the vertical direction with the air. Accordingly, it is possible to effectively cool the upper portion of the light emitting unit 5111 in the vertical direction and to realize the long life of the light source 51.

Since the attaching unit 624 is provided on the end portion of the second duct unit 623 through which the air flows, it is possible to maintain a comparatively low temperature of the attaching unit 624. Therefore, since it is possible to suppress the deformation of the attaching unit 624 due to heat, it is possible to stably attach the conducting member 64 and to reliably realize the contact between the conducting member 64 and the spring switches 2132.

In addition, the attaching unit 624 is provided at a position of the second duct unit 623 of the duct member 62 on the introduction port 621 side. According to this, since the air having a comparatively low temperature (air in the outside of the light source housing 6) flows to a portion of the duct member 62 where the attaching unit 624 is positioned, it is possible to reliably maintain a low temperature of the attaching unit 624. Accordingly, it is possible to reliably suppress the deformation of the attaching unit 624 due to heat and to reliably perform the stabilized attachment of the conducting member 64 and reliably realize the contact between the conducting member 64 and the spring switches 2132.

Since the conducting member 64 is a metal member, it is possible to suppress the deformation of the conducting member 64 due to heat. Since the conducting member 64 has a plate shape, it is possible to suppress enlargement of the light source device 5 due to the installation of the conducting member 64.

The connector 6123 is provided at a position on a side opposite to the Z direction by the attaching unit 624 in the side surface portion 6B intersecting with the main surface portion 6E and the bottom surface portion 6C. According to this, it is possible to mount the light source device 5 to the light source accommodation unit 21 and to connect the connector 6123 to the connector 212 provided in the light source accommodation unit 21. Accordingly, it is possible to reliably acquire the type of the light source device 5, even with the light source device 5 which is inserted into and mounted on the light source accommodation unit 21 in a direction orthogonal to the Z direction which is the proceeding direction of the emitted light (Y direction).

The terminal unit 213 provided on the light source accommodation unit 21 includes the two spring switches 2132 which come in contact with the conducting member 64 to be electrically connected thereto. According to this, it is possible to press each spring switch 2132 to the attaching unit 624 and the conducting member 64 attached to the attaching unit 624, due to a biasing force (spring force) of each spring switch 2132. Accordingly, it is possible to reliably switch the conduction state and the non-conduction state of the two spring switches 2132 depending on the presence or absence of the conducting member 64 and it is possible to reliably and suitably acquire the type of the light source 51 by the control unit 9.

The projector 1 includes the determination unit 92 which determines the type of the light source 51 based on the conduction state of the spring switch 2132 and the operation control unit 93 which controls the operation of the projector 1 based on the determined results from the determination unit 92. According to this, the operation control unit 93 can drive the light source 51 by the driving system according to the type of the light source 51. Accordingly, it is possible to improve driving starting performance of the light source 51 and to realize the long life.

[Second Embodiment]

Hereinafter, a second embodiment of the invention will be described.

A projector according to the embodiment has the same configuration as that of the projector 1, but in the projector 1, the control unit 9 determines the type of the light source 51 based on whether or not the two spring switches 2132 provided on the substrate 2131 are in the conduction state by the conducting member 64. With respect to this, in the projector according to the embodiment, the control unit determines the type of the light source based on the spring switch in the conduction state, in addition to whether or not three spring switches provided on the substrate are in the conduction state. The projector according to the embodiment is different from the projector 1, in this viewpoint. In the following description, the same reference numerals are used for the same or substantially the same parts as the above-mentioned parts and the description thereof will be omitted.

Figure 8:
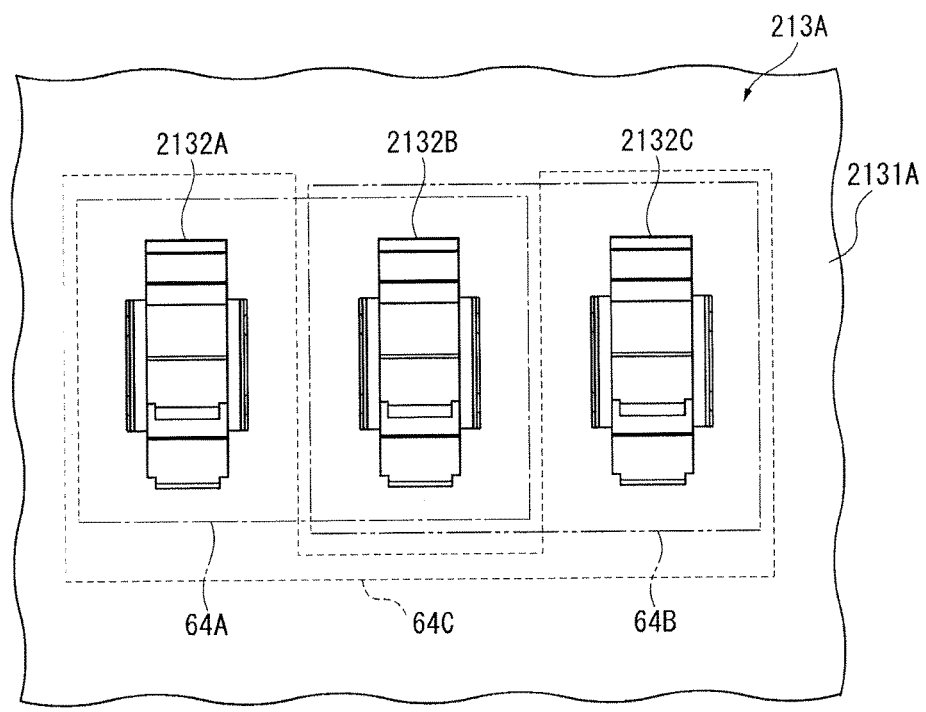
FIG. 8 is a diagram showing spring switches on a substrate included in a projector according to a second embodiment of the invention.

FIG. 8 is a diagram showing the spring switches 2132 provided on a substrate 2131A included in a terminal unit 213A included in the projector according to the embodiment.

The projector according to the embodiment has the same configurations and functions as those of the projector 1, except for that the terminal unit 213A is provided on the light source accommodation unit 21 instead of the terminal unit 213. As shown in FIG. 8, the terminal unit 213A has the same configurations and functions as those of the terminal unit 213, except for including the substrate 2131A where the three spring switches 2132 (2132A, 2132B, and 2132C) are provided, instead of the substrate 2131 where the two spring switches 2132 are provided.

The substrate 2131A outputs a signal of a voltage level according to the conduction state of the three spring switches 2132A to 2132C to the control unit 9. Specifically, the substrate 2131A outputs a signal of different voltage levels, in a case where the spring switches 2132A to 2132C are not in the conduction state and in a case where two of the three spring switches 2132A to 21320 are in the conduction state. In addition, the substrate outputs a signal of different voltage levels, in a case where the spring switches 2132A and 2132B are in the conduction state by a conducting member 64A shown with a dashed-dotted line in FIG. 8, in a case where the spring switches 2132B and 2132C are in the conduction state by a conducting member 64B shown with a dashed-two dotted line in FIG. 8, and in a case where the spring switches 2132A and 2132C are in the conduction state by a conducting member 64C shown with a dotted line in FIG. 8. The conducting members 64A to 64C have the same configurations as those of the conducting member 64.

Meanwhile, the conducting members 64A to 64C are not attached or any of the conducting members 64A to 64C are attached to the attaching unit 624 according to the type of the light source 51 accommodated therein.

The determination unit 92 configuring the control unit 9 determines the type of the light source 51 based on the voltage level of the signal input from the substrate 2131A and the operation control unit 93 controls the operation of the projector 1 according to the type of the light source 51 determined by the determination unit 92.

According to the projector according to the embodiment described above, it is possible to realize the same effects as those of the projector 1 and to also realize the following effects.

When two of the three spring switches 2132A to 2132C provided on the substrate 2131A are electrically connected by the conducting members 64A to 64C and the conduction state and the non-conduction state of the spring switches 2132A to 2132C and the type of the light source 51 are associated, it is possible to increase the number of types of the light source 51 to be shown when the conducting members 64A to 64C are provided. Accordingly, it is possible to show the plurality of types of the light source 51 with a simple configuration.

[Modification Example]

The invention is not limited to the embodiments described above, and variations and improvements are included in the invention in a scope for achieving the object of the invention.

In the embodiments described above, one attaching unit 624 is provided on the light source device 5, but the invention is not limited thereto. That is, the number of the attaching units 624 may be suitably set and at least two spring switches 2132 may be provided on the light source accommodation unit 21 according to the number of the attaching units 624. It is possible to increase the number of detectable types of the light source 51 according to the number of the attaching units 624.

In the first embodiment, two spring switches 2132 are provided on the substrate 2131, and in the second embodiment, three spring switches 2132 are provided on the substrate 2131A, but the invention is not limited thereto. For example, four or more spring switches may be provided on the substrate 2131, and the type of the light source 51 may be determined based on the voltage level of the signal output by electrically connecting two of the four or more spring switches 2132 by the conducting member 64. In addition, three or more spring switches 2132 may come in contact with the conducting member 64 at the same time.

In the embodiments described above, the spring switches 2132 provided on the light source accommodation unit 21 are arranged along the Z direction and are disposed at a predetermined interval in the Z direction. However, the invention is not limited thereto. The spring switches 2132, for example, may be arranged along the X direction and disposed at a predetermined interval in the X direction. In this case, it is possible to easily bring the conducting member 64 (64A to 64C) to come in contact with the corresponding two spring switches 2132, even in a case where the light source device 5 is inserted into and mounted on the light source accommodation unit 21 in a direction opposite to the Y direction from the bottom surface portion 6C side, or in a case where the light source device 5 is inserted into and mounted on the light source accommodation unit 21 in the Z direction from the main surface portion 6E side.

In the embodiments described above, the attaching unit 624 is provided on the second duct unit 623, but the invention is not limited thereto. The attaching unit 624 may be provided on the first duct unit 622 and the position of the attaching unit 624 may not be a position of the duct member 62 on the introduction port 621 side. The attaching unit 624 may be provided on the housing main body 61, not the duct member 62. At that time, as long as the attaching unit 624 is in a position separated from the light emitting unit 5111, it is possible to realize difficulty of regarding to the receiving of the effect of heat generated in the light emitting unit 5111, and to also realize the difficulty of regarding to the receiving of the effect of ultraviolet light and infrared light, when the attaching unit 624 is not on the rear surface side (side opposite to the reflecting surface 5221) of the main reflector 52 configured as a cold mirror. In addition, when the duct is formed on the housing main body 61, the attaching unit 624 may be provided on the duct.

In the embodiments described above, the connector 6123 as the connection unit is provided on the side surface portion 6B including the second surface portion 612B. However, the invention is not limited thereto. That is, the installation position of the connector 6123 may be any surface of the light source housing 6. The connector 6123, for example, may be provided on the bottom surface portion 6C of the light source housing 6. In this case, it is possible to easily connect the connector 6123 to the connector 212 provided on the bottom portion of the light source accommodation unit 21, in any cases of a case where the light source device 5 is inserted into and mounted on the light source accommodation unit 21 in a direction opposite to the Y direction from the bottom surface portion 6C side (first mounting method), a case where the light source device 5 is inserted into and mounted on the light source accommodation unit 21 in the X direction from the side surface portion 6B side (second mounting method), a case where the light source device 5 is inserted into and mounted on the light source accommodation unit 21 in the direction opposite to the X direction from the side surface portion 6D side (second mounting method), and a case where the light source device 5 is inserted into and mounted on the light source accommodation unit 21 in the Z direction from the main surface portion 6E side (third mounting method).

The connector 6123 may not be on the side opposite to the Z direction (emission direction of light) with respect to the attaching unit 624 or may be disposed on the Z direction side.

In the embodiments described above, the conducting member 64 is set as the plate-shaped metal member, but the invention is not limited thereto. The conducting member may have other shapes, as long as it is electrically connected to the two spring switches 2132 and causes the two spring switches 2132 to be in the conduction state, and the conducting member may be formed with other materials. For example, the conducting member may be configured with a metal line or metal foil, or may be configured by coating a conductive resin. As long as resistance is included as the conducting member, a voltage value of current flowing between the two spring switches 2132 through the resistance changes, the control unit 9 can specifically acquire the type of the light source based on the voltage value.

In the embodiment, the terminal unit 213 includes the spring switches 2132, but the invention is not limited thereto. That is, a switch having other configurations may be used, as long as it comes into contact with the conducting member 64 attached to the attaching unit 624 and changes the state from the non-conductions state to the conduction state.

In the embodiments described above, the operation control unit 93 drives the light source 51 by the driving method corresponding to the type of the light source 51, but the invention is not limited thereto. For example, when the temperature of the light source 51 at the time of driving is different depending on the type thereof, the cooling device 7 (particularly, fans 72 and 73) may be driven by the driving method corresponding to the type of the light source 51. When waveform characteristics of light emitted from the light source 51 are different depending on the type thereof, the driving state of the liquid crystal panel 442 as the optical modulation device may be changed according to the type of the light source 51. That is, the operation of the projector may be controlled according to the type of the light source 51.

In the embodiments described above, the terminal units 213 and 213A output signals having different voltage levels to the control unit 9, in a case where the two spring switches 2132 are in the conduction state or in a case where the two spring switches are in the non-conduction state, but the invention is not limited thereto. That is, when the control unit 9 can grasp whether the two spring switches 2132 are in the conduction state or in the non-conduction state, the content of the signal output by the terminal units 213 and 213A can be suitably changed.

In the embodiments described above, when it is determined that the opening of the exterior housing 2 is blocked by the lid member and the light source device 5 is accommodated in the light source accommodation unit 21, the determination unit 92 determines the type of the light source 51 based on the signal input from the terminal unit 213. However, the invention is not limited thereto. For example, the determination unit 92 may determine the type of the light source 51 based on the input signal, when accommodation of the light source device 5 into the light source accommodation unit 21 is simply detected, without detecting the blocking of the opening of the exterior housing 2. That is, an electronic device may have a configuration in that the determination unit 92 determines the type of the light source 51 according to the signal input from the terminal unit 213.

In the embodiments described above, one end of the flow diverting member which is provided in the duct member 62 and diverts the flow of air introduced therein from the introduction port 621 is axially supported and the other end thereof is a plate-shaped member rotating by its own weight, and the air is introduced to each of the first duct unit 622 and the second duct unit 623, by forming a hole on the flow diverting member, but the invention is not limited thereto. For example, without forming the hole on the flow diverting member, the air may be introduced to the duct unit on the upper portion in the vertical direction, among the first duct unit 622 and the second duct unit 623. In addition, the flow diverting member is not limited to the plate-shaped member rotating by its own weight, and may move by sliding. Further, the flow diverting member may not be used.

In the embodiments described above, the optical unit 4 has an approximate L shape in a plan view, but there is no limitation thereto. For example, the optical unit may have an approximate U shape in a plan view.

In the embodiments described above, the projector 1 includes the three liquid crystal panels 442 (442R, 442G, and 442B), but the invention is not limited thereto. That is, the invention can also be applied to a projector using two or less or four or more liquid crystal panels.

In the embodiments described above, the transmissive liquid crystal panels 442 having a separate light incident surface and light emitting surface are used, but reflective liquid crystal panels having the same light incident surface and light emitting surface may be used. In addition, as long as it is an optical modulation device which can modulate incident light flux and form an image according to image information, an optical modulation device other than the liquid crystal, such as a device using a micromirror or a digital micromirror device (DMD) may be used.

In the embodiments described above, the front-type projector having substantially the same projection direction of an image and an observation direction of the image, has been exemplified, but the invention is not limited thereto. For example, the invention can also be applied to a rear-type projector having the projection direction and the observation direction which are opposite directions.

In the embodiments described above, an example using the light source device 5 in the projector 1 has been exemplified, but the invention is not limited thereto. That is, the light source device 5 can also be used in the illumination device.

CROSS REFERENCE TO RELATED APPLICATIONS

This application claims priority to Japanese Patent Application No. 2014-041608 filed on Mar. 4, 2014, and No. 2013-063561 filed on Mar. 26, 2013, the entire contents of which are incorporated by reference herein.

REFERENCE SIGNS LIST

1: projector
2: exterior housing
5: light source device
6: light source housing
6B: side surface portion
6C: bottom surface portion
6D: side surface portion
6E: main surface portion
21: light source accommodation unit
45: projection optical device
51: light source
61: housing main body
62: duct member
64 (64A, 64B, 64C): conducting member
92: determination unit
93: operation control unit
213, 213A: terminal unit
442 (442B, 442G, 442R): liquid crystal panel (optical modulation device)
621: introduction port
622: first duct unit
623: second duct unit
624: attaching unit
611B: second surface portion (side surface)
2132 (2132A, 2132B, 2132C): spring switch
6123: connector (connection unit)

The invention claimed is:

1. A light source device comprising:
a light source which emits light;
light source housing which accommodates the light source therein, the light source housing including an attaching unit which can attach a conducting member having conductivity to a surface of the light source housing;
a light source accommodation unit which is provided in an exterior housing of an electronic device and detachably accommodates the light source device; and
and a terminal unit which is disposed at a position corresponding to the attaching unit of the light source device accommodated in the light source accommodation unit of the exterior housing, and electrically comes into contact with and is electrically connected to the conducting member attached to the attaching unit, wherein
the conducting member is attached to the attaching unit according to the type of the light source.

2. The light source device according to claim 1, wherein the light source housing includes
a housing main body which accommodates the light source therein, and
a duct member which is attached to the housing main body and introduces air which is introduced into the housing main body, and
the attaching unit is provided on the duct member.

3. The light source device according to claim 2, wherein the duct member includes
an introduction port which introduces the air therein,
a first duct unit which introduces the air introduced from the introduction port to one side of the housing main body in a vertical direction, and
a second duct unit which introduces the air introduced from the introduction port to the other side of the housing main body in a vertical direction, and
the attaching unit is provided on one of the first duct unit and the second duct unit.

4. The light source device according to claim 3, wherein the attaching unit is provided at a position of the duct member on the introduction port side.

5. The light source device according to claim 1, wherein the conducting member is a plate-shaped metal member.

6. The light source device according to claim 1, wherein the light source housing includes a connection unit which supplies supplied power to the light source, and
the connection unit is disposed on any position on the side opposite to the emission direction of light from the light source housing by the attaching unit, regarding a bottom surface portion of the light source housing, a main surface portion where light is emitted in the light source housing, and a side surface portion intersecting with the bottom surface portion.

7. A projector comprising:
the light source device according to claim 1;
an optical modulation device which modulates light emitted from the light source device;
a projection optical device which projects light modulated by the optical modulation device; and
the exterior housing which accommodates the light source device, the optical modulation device, and the projection optical device therein.

8. The projector according to claim 7, wherein the terminal unit includes a plurality of spring switches which come in contact with the conducting member and are electrically connected.

9. The projector according to claim 8, wherein the plurality of spring switches contain at least three spring switches, and
the conducting member comes into contact with two spring switches among at least three spring switches and causes the two spring switches to be electrically connected.

10. The projector according to claim 7, further comprising:
a determination unit which determines the type of the light source based on the conduction state of the terminal unit; and
an operation control unit which controls the operation of the projector according to determined results from the determination unit.

* * * * *